United States Patent
Antunes et al.

(10) Patent No.: US 9,341,079 B2
(45) Date of Patent: May 17, 2016

(54) ROLLING BEARING FOR AIRCRAFT TURBOJET FITTED WITH IMPROVED MEANS OF AXIAL RETENTION OF ITS OUTER RING

(75) Inventors: Serge Louis Antunes, Combs La Ville (FR); Michel Brault, Quincy Sous Senart (FR)

(73) Assignee: SNECMA, Paris (FR)

( * ) Notice: Subject to any disclaimer, the term of this patent is extended or adjusted under 35 U.S.C. 154(b) by 812 days.

(21) Appl. No.: 13/701,660

(22) PCT Filed: May 31, 2011

(86) PCT No.: PCT/FR2011/051244
§ 371 (c)(1),
(2), (4) Date: Jan. 2, 2013

(87) PCT Pub. No.: WO2011/151592
PCT Pub. Date: Dec. 8, 2011

(65) Prior Publication Data
US 2013/0156574 A1    Jun. 20, 2013

(30) Foreign Application Priority Data
Jun. 2, 2010  (FR) ..................................... 10 54283

(51) Int. Cl.
*F01D 25/16* (2006.01)
*F01D 21/04* (2006.01)

(52) U.S. Cl.
CPC ............ *F01D 25/164* (2013.01); *F01D 21/045* (2013.01); *F05D 2260/30* (2013.01); *Y02T 50/671* (2013.01); *Y10T 29/4932* (2015.01)

(58) Field of Classification Search
CPC ....... F01D 21/00; F01D 21/04; F01D 21/045; F01D 21/08; F01D 25/16; F01D 25/162; F01D 25/164

USPC .......................................... 384/581, 517, 483
See application file for complete search history.

(56) References Cited

U.S. PATENT DOCUMENTS

| 4,378,197 A | 3/1983 | Cattaneo et al. |
| 5,813,214 A | 9/1998 | Moniz et al. |

(Continued)

FOREIGN PATENT DOCUMENTS

| EP | 0 042 320 | 12/1981 |
| EP | 0 852 286 | 7/1998 |

(Continued)

OTHER PUBLICATIONS

International Search Report Issued Sep. 7, 2011 in PCT/FR11/51244 Filed May 31, 2011.

*Primary Examiner* — Edward Look
*Assistant Examiner* — Cameron Corday
(74) *Attorney, Agent, or Firm* — Oblon, McClelland, Maier & Neustadt, L.L.P (57) ABSTRACT

A structure for an aircraft turbojet including a rolling bearing including an outer ring, a bearing bracket, a retaining ring interposed between the ring and the bracket, a mechanism to connect the ring onto the bracket incorporating an attaching flange installed on the bearing bracket, a flexible connection attached to the ring and to the flange, and a mechanism enabling axial retention of the ring, in event the flexible connection fractures. The mechanism enabling axial retention includes a first stop securely attached to the retaining ring and capable of axially retaining this retaining ring relative to the bracket, and a second stop securely attached to the retaining ring, and capable of axially retaining the ring relative to the retaining ring.

7 Claims, 5 Drawing Sheets

(56) References Cited

U.S. PATENT DOCUMENTS

| | | |
|---|---|---|
| 6,240,719 B1 | 6/2001 | Vondrell et al. |
| 6,413,046 B1 | 7/2002 | Penn et al. |
| 6,491,497 B1 | 12/2002 | Allmon et al. |
| 6,540,483 B2 * | 4/2003 | Allmon .................. F01D 25/16 384/581 |
| 2003/0039538 A1 | 2/2003 | Allmon et al. |
| 2008/0107530 A1 | 5/2008 | Bart et al. |

FOREIGN PATENT DOCUMENTS

| | | |
|---|---|---|
| EP | 1 008 726 | 6/2000 |
| EP | 1 191 191 | 3/2002 |
| EP | 1 630 357 | 3/2006 |
| EP | 1 921 273 | 5/2008 |

* cited by examiner

ROLLING BEARING FOR AIRCRAFT TURBOJET FITTED WITH IMPROVED MEANS OF AXIAL RETENTION OF ITS OUTER RING

TECHNICAL FIELD

The present invention relates to the field of aircraft turbojets, and more specifically to the means implemented within these turbojets to respond to the unbalance caused by the loss of a fan blade. This problem is notably addressed in documents EP 1 653 051, EP 1 916 431, FR 2 752 024 and FR 2 888 621.

STATE OF THE PRIOR ART

Loss of one or more fan blades usually results in a large unbalance in the fan rotor holding the blades, and this unbalance is likely to imperil the integrity of the turbojet's structures. To respond to this problem, and to protect the structures, it is known to make fusible zones in the radial forces transmission pathway.

Fusible mechanical connections are for example made between the outer ring of the two rolling bearings closest to the fan rotor, and the turbojet casing. These mechanical connections are dimensioned to withstand the radial forces in a normal flight configuration and, in the event of loss of at least one fan blade, to fracture following the unbalance caused by this loss. This system is also known by the name "mechanical decoupling system".

Following these two fractures, a single rolling bearing, of the three initially installed, continues to centre the drive shaft. Since this single centring is insufficient to maintain the integrity of the turbojet, the means of connection of the intermediate bearing to the casing include a retention portion located radially opposite an additional retention portion, installed on the casing and centred with the retention portion. Before the fusible mechanical connections fracture this retention portion and this additional retention portion remain at a radial distance from one another, and are not therefore active. Conversely, after the fusible mechanical connections fracture following a loss of a fan blade, the retention portion which is subjected to radial stress is designed to come into contact with the additional retention portion, and subsequently to be imparted with a motion relative to the latter, under the combined effect of a precessional motion of the fan rotor, and of the contact with the additional retention portion. When the retention portion and the additional retention portion respectively have the shape of two annular raceways, of different sizes, the relative motion of the retention portion is a rolling motion of the latter on the additional retention portion. During this rolling motion the rotational axis of the retention portion is therefore in motion relative to the additional retention portion, which remains attached to the casing.

The design as described above is such that it causes the fastest possible mechanical decoupling. The design is such, for example, that a duration of the order of one millisecond is not exceeded between the instant of the loss of the fan blade and the instant of the fracture of the fusible mechanical connections.

During this period, called the decoupling time, the outer rings of the rolling bearings, and in particular that of the bearing closest to the fan, are subjected to very high radial loads. The consequences of these radial loads are a narrowing of the clearance between the outer ring and the cylindrical housing in which it is positioned, where this housing is generally defined by a retaining ring, which is itself attached to the bearing bracket connected in fusible fashion to the turbojet casing. When the clearance has been reduced to zero the outer bearing ring is imparted with a motion relative to the retaining ring, under the combined effect of a precessional motion of the fan rotor and the contact with this same retaining ring. More specifically, the relative motion of the outer ring is a rolling motion of the latter on the cylindrical housing of circular section defined by the retaining ring. During this rolling motion, the axis of the outer ring is therefore in motion relative to the retaining ring, which remains immobile relative to the bearing bracket. But, above all, the rolling motion of the outer bearing ring on the retaining ring leads to a relative tangential/circumferential displacement between these elements, which may damage the flexible connection means habitually installed between them.

Fracturing of these flexible connection means cannot therefore be ruled out. However, in the event that these means fracture, the outer bearing ring must be retained axially, in order to prevent debris from being expelled. In addition, its axial retention enables its rolling motion on the retaining ring to continue, until the instant of mechanical decoupling.

From the prior art, it is known to interpose means of axial retention of the outer ring between the bearing bracket and the upstream end of the ring. Indeed, the choice may be made to have multiple spacers installed by bolting on a forward end of the bearing bracket, and which cooperate with a forward end of the outer ring. This technical solution may be criticised in that it causes encumbrance and substantial overall mass, notably due to need to extend the outer bearing ring forwards, in order to provide the spacers attached to the bearing bracket with a stop surface. Indeed, this ring extension forwards is justified by the need for the latter to be extended beyond the retaining ring in which it is held, with the aim of receiving the stop spacers attached to the bearing bracket surrounding the retaining ring.

This extension forward of the outer bearing ring is sometimes impossible to accomplish, due to problems of encumbrance in this area of the turbojet which is already very dense.

A possibility indeed exists of reducing the axial dimension of the retaining ring and the axial dimension of the portion of the ring enabling it to be held in this retaining ring, but this reduction could result in an installation which is too mechanically weak. In addition, in the preferential case in which a dampening system by means of an annular oil film is designed between the retaining ring and the outer ring, this would also amount to reducing the axial dimension of this film, and would therefore imply a reduced efficiency of the dampening of the outer bearing ring.

DESCRIPTION OF THE INVENTION

The purpose of the invention is therefore to provide at least partially a solution to the disadvantages mentioned above, compared with the embodiments of the prior art.

To accomplish this, one object of the invention is a structure for an aircraft turbojet including:
  a rolling bearing including an outer ring;
  a bearing bracket surrounding said outer ring;
  a retaining ring interposed between the outer bearing ring and the bearing bracket;
  means of connecting the outer ring to the bearing bracket, where these means include:
    an attaching flange installed on the bearing bracket; and
    flexible means of connection attached firstly to the outer bearing ring, and secondly to the attaching flange;

where said structure also includes means allowing axial retention of the outer bearing ring, if said flexible connection means fracture, according to the invention, said means enabling axial retention of the outer ring include:
  first stop means securely attached to the retaining ring, and capable of axially retaining this retaining ring relative to the bearing bracket in the event that said flexible connection means fracture; and
  second stop means securely attached to the retaining ring, and capable of axially retaining the outer ring relative to this retaining ring, in the event that said flexible connection means fracture.

In addition, said second stop means take the form of multiple slugs spaced circumferentially relative to one another, where each one is held in a slug insertion opening made in said retaining ring, where said slugs have a radially internal end which is located in a groove made on said outer bearing ring fitted with multiple radial clearance through-holes, emerging in the base of said groove, where each of said slugs is positioned radially opposite a full portion of the base of said groove.

The invention is therefore remarkable in that it involves the outer ring being axially retained through the retaining ring. This leads, overall, to reduced encumbrance, and reduced overall mass of the structure compared to the solution of the prior art described above, particularly due to a reduction of the axial length of the outer ring, which does not however weaken the mechanical installation of the ring in the retaining ring.

Moreover, as will be explained below, the radial openings allow easy installation of the slugs on the retaining ring, whereas the full portion of the groove base allows, in operation, extraction of these slugs radially towards the interior to be prevented.

Said first stop means preferably take the form of a skirt fitted axially between the bearing bracket and said attaching flange. This skirt may be positioned with or without clearance between the two abovementioned elements, limiting/preventing axial displacement in both directions.

In such a configuration, it is also preferentially provided that said skirt has notches spaced circumferentially relative to one another, and cooperating with catches which are securely attached to said bearing bracket, in order to limit/prevent rotation of the retaining ring relative to said bearing bracket.

Each of said slugs is preferably located radially opposite the attaching flange. This configuration also enables, in operation, extraction of these slugs radially towards the exterior to be prevented.

Another object of the invention is a method for installing a structure for an aircraft turbojet defined above, including the following steps:
  insertion of the outer bearing ring in the retaining ring, so as to align radially each of the clearance holes made in the ring with a slug insertion opening made in the retaining ring;
  insertion of the slugs in the slug insertion openings, through the through-holes, so as to place the radially internal end of each slug in the groove of said outer ring;
  rotation of the outer bearing ring such that each slug is located radially opposite the full portion of the base of said groove; and
  installation of the attaching flange on the bearing bracket.

Another object of the invention is, lastly, an aircraft turbojet including a structure as described above.

Other advantages and characteristics of the invention will appear in the non-restrictive detailed disclosure below.

BRIEF DESCRIPTION OF THE DRAWINGS

This description will be made with reference to the attached illustrations, among which.

DETAILED DESCRIPTION OF PREFERRED EMBODIMENTS

Figure 1:
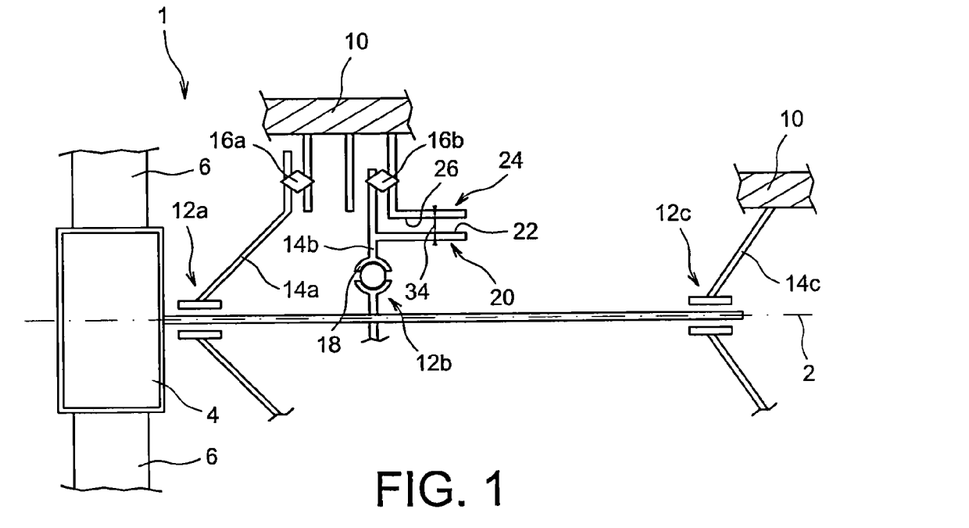
FIG. 1 represents a schematic longitudinal section view of a portion of a turbojet, according to a preferred embodiment of the present invention.

With reference to FIG. 1, a portion of a turbojet 1 for aircraft, according to a preferred embodiment of the present invention, can be seen schematically.

Conventionally, this turbojet 1 has a longitudinal axis 2 on which are centred a fan rotor 4 holding fan blades 6, together with a drive shaft 8 rigidly mounted such that it rotates with rotor 4, also called a fan disk.

Turbojet 1 also includes a casing 10 forming an immobile rigid case, where this casing is represented very schematically in FIG. 1. To hold and guide shaft 8, there are three rolling bearings, spaced one after another in the direction of axis 2, where these bearings are referenced respectively, from forward to rear, 12a, 12b and 12c.

The outer ring of each of these three rolling bearings is attached to casing 10 by connection means respectively referenced 14a, 14b and 14c. As has been represented diagrammatically in FIG. 1, each of these connection means takes the form of a bearing bracket forming an annular structure connecting the outer ring directly to the casing, or to an internal extension of this casing, as is the case for the two forward bearings 12a, 12b, located closest to rotor 4.

Forward-most bearing 12a and rear-most bearing 12c are each designed to transmit radial forces, whereas intermediate rolling bearing 12b is also designed to retain shaft 8 axially.

With regard to the two forward bearings 12a, 12b, each of their bearing brackets 14a, 14b is connected to casing 10 by a fusible mechanical connection 16a, 16b. These connections are made, for example, using screws, the number, dimensioning and positions of which are chosen so as to give the desired fusible character, which will be explained below.

Bearing bracket 14b of outer ring 18 of intermediate bearing 12b, on casing 10, has the additional feature that it includes a retention portion 20 forming an annular raceway 22 centered on axis 2. This annular raceway 22 is aligned radially towards the exterior, and located radially opposite an additional retention portion 24 installed on casing 10. More specifically, this portion 24 includes an additional raceway 26, which is also annular and centred on axis 2. In normal flight configuration, as represented diagrammatically in FIG. 1, raceway 26 is therefore located around and at some distance from raceway 22, such that they do not cooperate with one another. The retention means constituted by both portions 20, 24 thus remain inactive, since raceways 22, 26 are at a radial distance from one another, forming an annular clearance 34 which is roughly constant over their entire perimeter.

In this normal configuration, fusible mechanical connections 16a, 16b are sufficiently resistant to withstand the radial forces transmitted by forward bearings 12a, 12b, which are used to maintain the rotation of shaft 8 in longitudinal axis 2 of the turbojet.

In the event of an exceptional problem leading to the loss of one or more fan blades 6, rotor 4 is subjected to an unbalance, which causes extremely high radial forces in the structures of the turbojet, and in particular in bearing brackets 14a, 14b and 14c.

Figure 2:
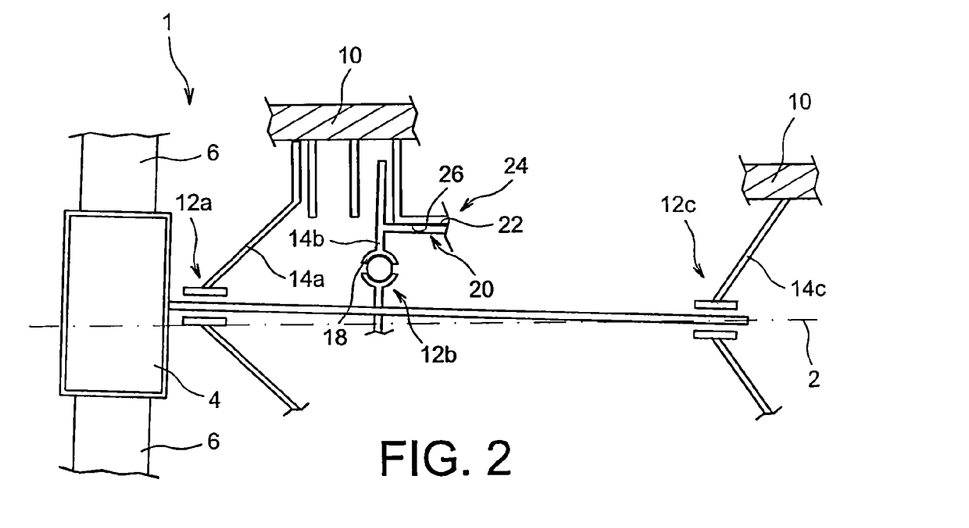
FIG. 2 represents a view similar to that of FIG. 1, with the turbojet in a configuration such as the one adopted after the mechanical decoupling of the bearings following the loss of a fan blade.

As previously mentioned, the two fusible mechanical connections 16a, 16b are designed to fracture when brackets 14a, 14b are subjected to these extremely high radial forces, the magnitude of which can be predetermined. With reference to FIG. 2, the almost-immediate consequence of these fractures is that shaft 8 holding rotor 4 which is being subjected to the unbalance is subject to radial deflection, where this deflection causes raceway 22 to be moved, also radially, with bracket 14b, until it comes into contact with additional raceway 26, after reducing radial clearance 34 to zero. A punctiform contact 36 is then established between both raceways 22, 26, which were initially separate, as is represented diagrammatically in FIG. 4.

Once contact has been established the radial deflection of shaft 8 is stopped. This shaft is then subject, in a manner which is known to the skilled man in the art, to a precessional motion, during which it continues to rotate on its own axis, and also rotates around longitudinal axis 2, from which it remains angularly offset. With this regard, it is stipulated that rear bearing 12c continues to guide this shaft 8 and to centre it sporadically on axis 2.

The precessional motion of shaft 8 and of its rotor 4, combined with the contact of retention portions 20, 24, causes retention portion 20 to be imparted with motion relative to additional retention portion 24.

This relative motion is a rolling motion, habitually involving no sliding due to the very high contact forces, of raceway 22 on immobile raceway 26 of greater diameter.

The design as described above is such that it causes the fastest possible mechanical decoupling. The design is such, for example, that a duration of the order of one millisecond is not exceeded between the instant of the loss of fan blade 6, and the instant of the fracture of fusible mechanical connections 16a, 16b.

More specifically, the invention seeks to limit the risks of damage to the turbojet before the mechanical decoupling, as will now be described in detail. Indeed, during the decoupling time, the outer rings of both rolling bearings, and in particular that of bearing 12a closest to the fan, are subjected to very high radial loads.

With reference at present to FIGS. 3 to 6, a structure 40 of the turbojet can be seen the core of which is constituted by forward bearing 12a. This structure 40 also includes annular bearing bracket 14a, defining a bore 42 centred on axis 2. This bore tightly holds a retaining ring 44 having the shape of a sleeve or of a metal ring centred on axis 2, which itself defines a bore 45, in which outer ring 46 of bearing 12a is held. Retaining ring 44 is therefore interposed radially between bore 42 of bracket 14a and ring 46, which, internally, holds rollers 48 of the bearing.

Outer ring 46 holds two annular metal seals or segments 47, spaced axially relative to one another, and each of which makes a sealed connection with bore 45 defined by retaining ring 44. Between these seals 47, which are preferably made of cast iron, there is an annular clearance between the outer surface of ring 46 and bore 45, where this clearance is filled with oil in order to form an annular oil film 49 constituting a dampening system. This system, which is also called a "Squeeze Film", indeed enables the vibrations of ring 46, which are essentially in the radial direction, to be dampened. As an illustration, the oil is conventionally supplied by port 61 shown in FIG. 3.

Figure 3:
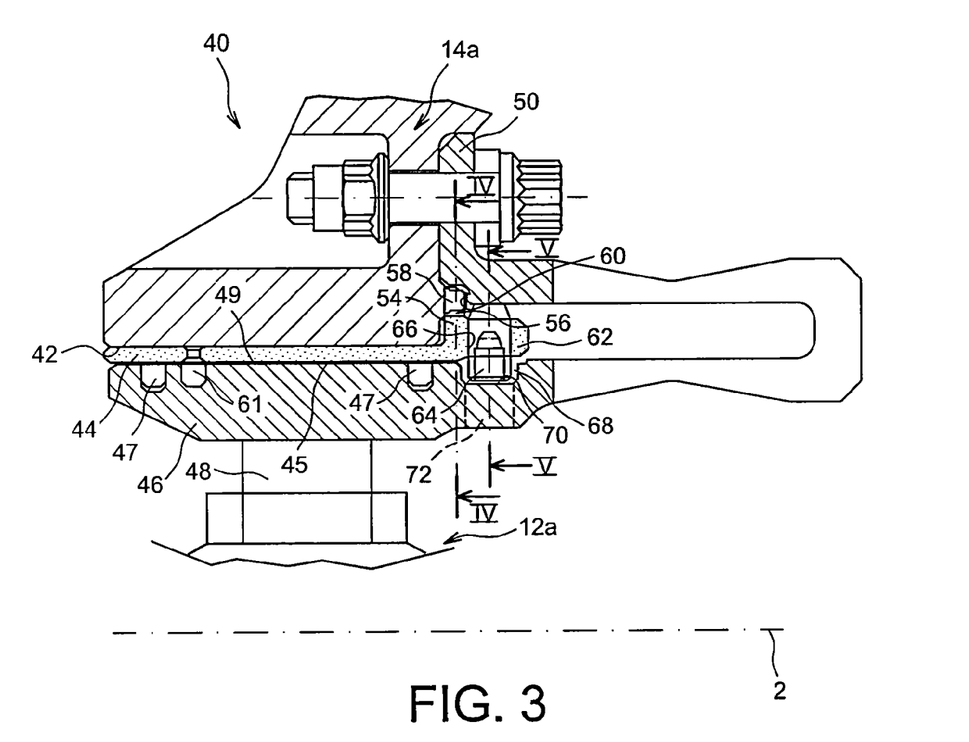
FIG. 3 represents a more detailed section view of a structure of the turbojet shown in the previous figures, where this structure includes in particular the rolling bearing closest to the fan, and shown in the form of a preferred embodiment of the invention.
Figure 6:
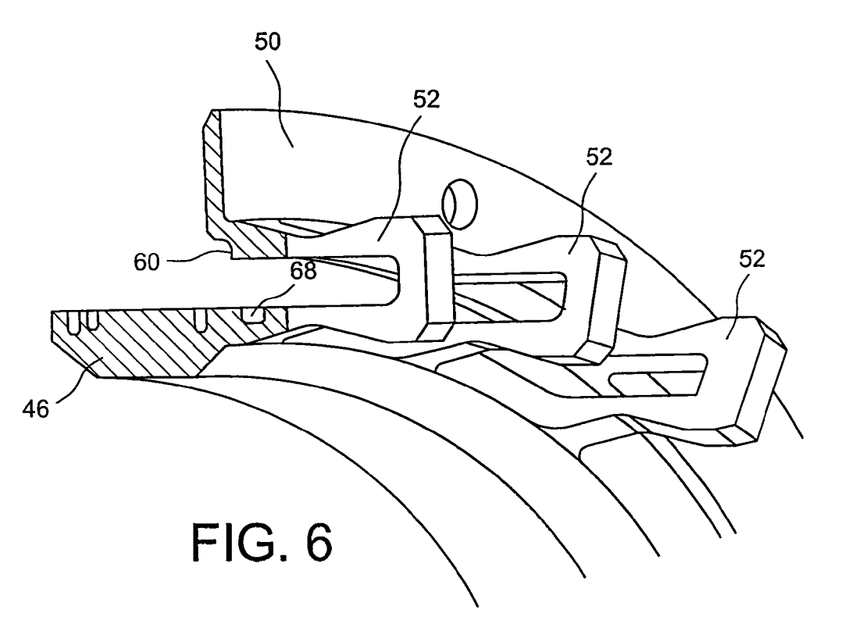
FIG. 6 represents a partial perspective view of means of flexible connection between the outer ring of the rolling bearing of the previous figure, and the flange attaching this ring to the bearing bracket.

Connection means are provided between ring and bracket 14a. These means include firstly an attaching flange 50 centred on axis 2, and installed in bolted fashion on to a downstream side of bracket 14a. This flange 50 is then positioned radially opposite, and at some distance from, the rear end of outer ring 46. To connect them, flexible means are provided, in the form, for example, of multiple spindles 52 spaced circumferentially relative to one another, as is shown in FIGS. 3 and 6. Each of these spindles 52, which are for example U-shaped and positioned in a radial plane, has two lateral branches connected by a base at their rear ends, and the two front ends of which are respectively attached to flange 50 and to the rear end of ring 46, preferably by welding. These spindles 52 allow radial clearances of ring 46 in bore 45, dampening bearing 12a by means of oil film 49.

Figure 4:
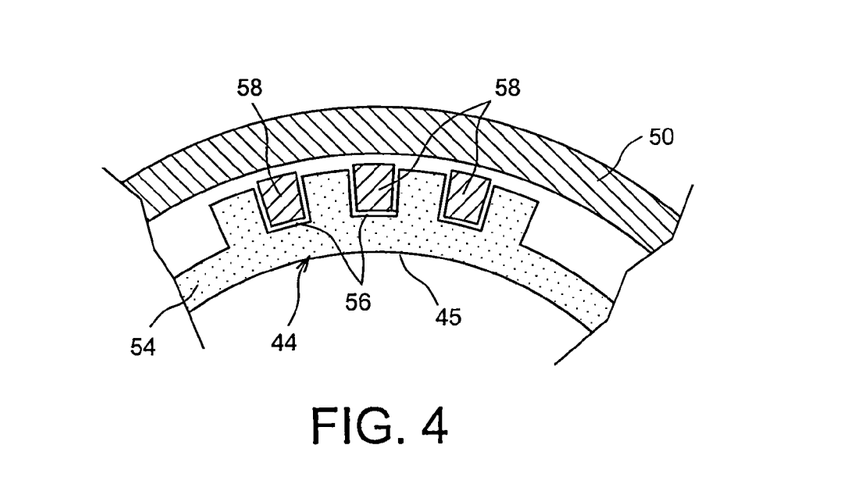
FIG. 4 represents a section view from along line IV-IV of FIG. 3.

At its rear end, retaining ring 44 has a skirt 54 which extends radially towards the exterior, and defining notches 56 spaced circumferentially relative to one another. Each of these notches 56, which are open radially towards the exterior, holds a catch 58 protruding axially towards the rear from the downstream side of bearing bracket 14a, to which these catches 58 are securely attached. The mechanical connection made by the connection between notches 56 and catches 58, as shown in FIG. 4, prevents/limits rotation in axis 2 of retaining ring 44 in bore 42 of bracket 14a.

FIG. 3 shows that toothed skirt 54 is held axially between the downstream side of bracket 14a, and an axial annular stop surface 60 made on flange 50, using a shoulder. This axial clamping of skirt 54, which is accomplished with or without clearance, enables the skirt to be retained axially relative to bracket 14a, and to flange 50, in both axial directions. Skirt 54 therefore forms first stop means, which are securely attached to the retaining ring, and which are capable, in particular, of axially holding this retaining ring 44 relative to bearing bracket 14a, if spindles 52 fracture.

Figure 5:
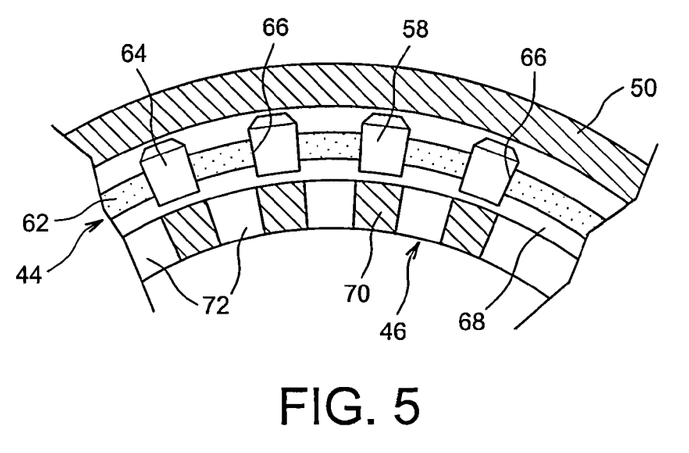
FIG. 5 represents a section view from along line V-V of FIG. 3.

Retaining ring 44 also has an annular rear extension 62 fitted with slugs 64 which are spaced circumferentially relative to one another. As can be seen in FIGS. 3 and 5, each slug 64 is held in an insertion opening 66 made in extension 62. They may be installed in any manner deemed appropriate for the skilled man in the art, for example by forcing or by screwing.

Each slug 64 is aligned roughly radially, with its radially internal end held in a groove 68 made on the rear end of ring 46, and is radially open towards the exterior. As can be seen best in FIG. 5, it is noted that the radially internal end of each slug 64 is located radially opposite a full portion 70 of the groove base. Indeed, this groove base is not full along its entire annular perimeter, since the full portion is interrupted by the presence of multiple radial clearance holes 72 traversing ring 46. These holes 72, which are spaced circumferentially relative to one another, and each of which therefore emerges in the base of the groove, between two portions of full portion 70, allow slugs 64 to be installed, as will be explained below.

In addition, the radially external end of each slug 64 is located radially opposite attaching flange 50. Thus, slugs 64 which are regularly positioned around axis 5 are enclosed in both radial directions, which prevents them from being lost in the event of an accidental fracture of their connection with annular extension 62.

Slugs 64, which are clamped with or without clearance between the two lateral sides of groove 68 centred on axis 2, enable the annular extension of retaining ring 62 to be retained axially relative to the outer ring of bearing 46, in both axial directions. These slugs 64 therefore form second stop means which are securely attached to the retaining ring, and which are capable, in particular, of axially holding outer ring of bearing 46 relative to this retaining ring 44, if spindles 52 fracture.

Figure 7A:
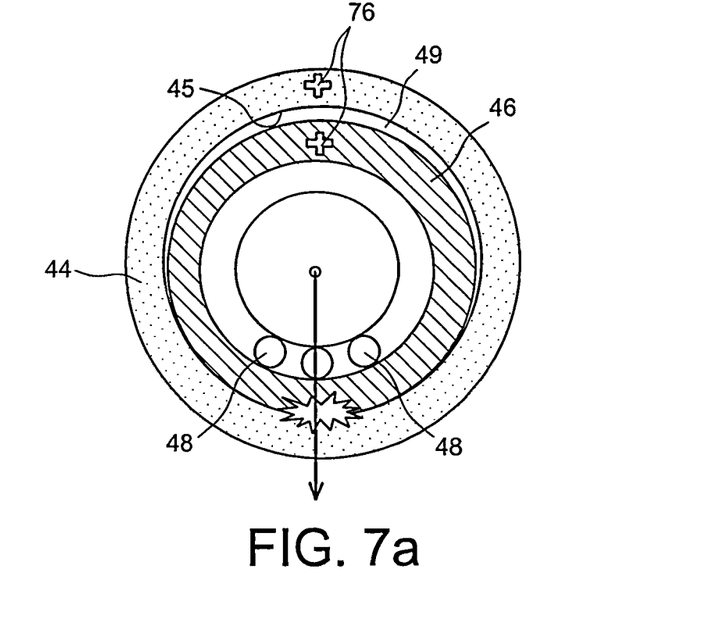
FIGS. 7a and 7b represent diagrammatically the motion of the outer bearing ring before the mechanical decoupling of the bearings.
Figure 7B:
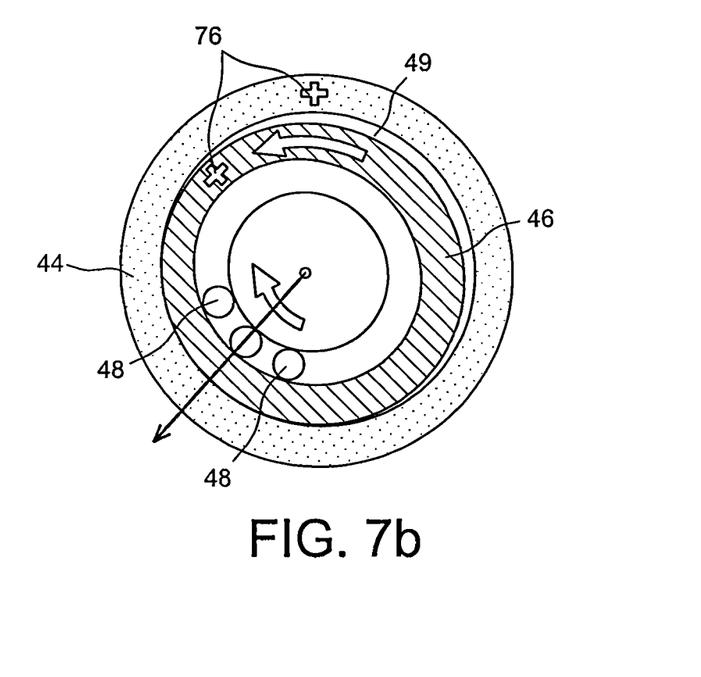

FIGS. 7a and 7b show schematically the motion of the outer ring of bearing 46 before the mechanical decoupling of the bearings, and after the loss of a fan blade, during the decoupling time. In these figures, it is shown that while outer ring 46 rolls on the bore of retaining ring 45, a tangential/circumferential relative displacement is created simultaneously between these two elements, as is shown by the change of relative positions between the two crosses 76, respectively representing symbolically any two points of the retaining ring and of the ring. This tangential/circumferential relative displacement causes a circumferential stressing of flexible connection spindles 52, which can therefore be damaged, until they fracture, if applicable.

If such an accidental fracture of flexible spindles 52 occurs, outer ring 46 of the forward bearing is no longer retained axially by these damaged spindles, but the task is taken up by the abovementioned first and second stop means, which are capable, in combination, of accomplishing the axial retention of ring 46 and of the whole of bearing 12a, relative to bearing bracket 14a.

As an illustration, it is noted that the location of such a fracture of spindles 52 can be predetermined, for example for a portion of small section. This location is chosen such that after the fracture slugs 64 continue to be enclosed radially by the rear end of ring 46, and by attaching flange 50.

Due to this contingency axial retention, outer ring 46 can continue to roll on the bore of retaining ring 45 until the moment of the bearings' mechanical decoupling, from which moment this ring 46 is no longer stressed radially, and no longer risks being damaged. Indeed, after the bearings are decoupled mechanically the radial forces essentially transit through intermediate bearing 12b, as is described above with reference to FIG. 2.

Figure 8A:
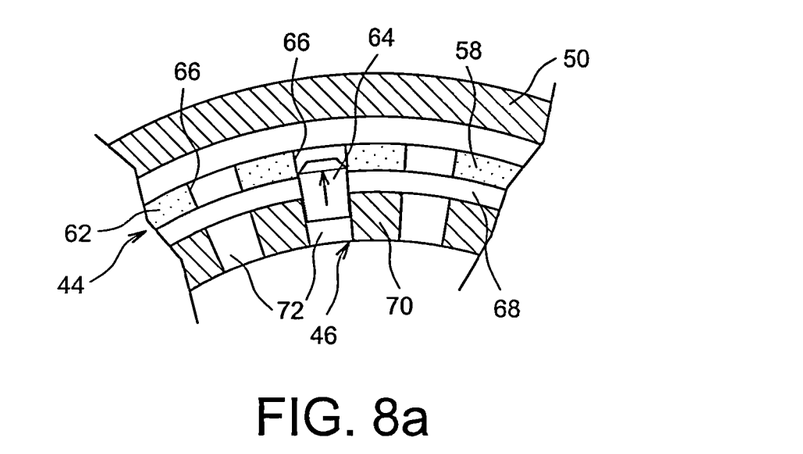
FIGS. 8a and 8b represent diagrammatically steps of a preferred method of installation of the structure shown in the previous figures.
Figure 8B:
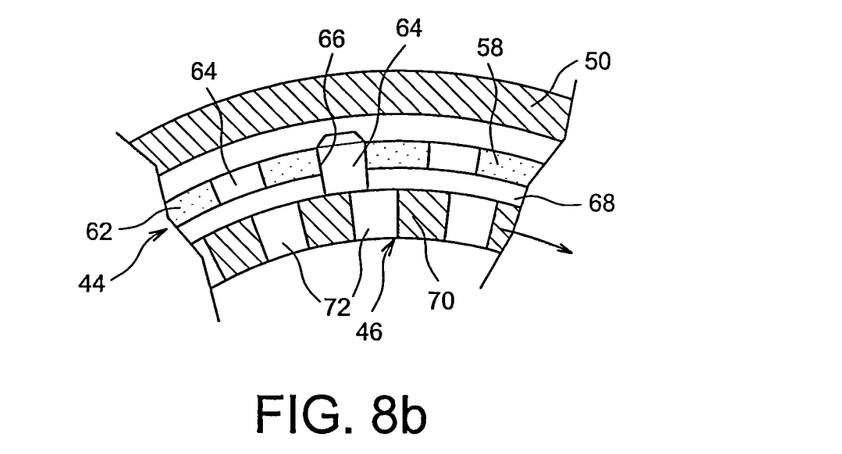

FIGS. 8a and 8b represent diagrammatically a method for installing structure 40 shown in FIGS. 3 to 7b.

Retaining ring 44 is firstly installed tightly in bore 42 of bracket 14a. The relative angular position between the two elements is chosen such that after installation catches 58 are held in notches 56 of the skirt of retaining ring 54.

After this, the outer ring of bearing 46 is inserted in the bore of retaining ring 45, by axial relative displacement between these two elements. This insertion is accomplished so as to radially align each of clearance holes 72 made in ring 46 with a slug insertion opening 66 made in the retaining ring, as is represented diagrammatically in FIG. 8a. In this same figure, the following step, which consists in inserting slugs 64 in slug insertion openings 66, passing through clearance holes 72, is represented. Each slug 64 therefore traverses a hole 72 radially towards the exterior, until it is held in its associated insertion opening 66. In its final position slug 64 has its radially internal end held in groove 68 of the outer ring, and is completely extracted from hole 72 which it has traversed.

After this, as has been represented diagrammatically in FIG. 8b, outer ring 46 is rotated such that each slug 64 is located radially opposite full portion 70 of the base of the groove. Thus, instead of being radially opposite clearance holes 72, slugs 64 are located opposite full portion 70, which forms a radial stop towards the interior. The rotation of ring 46 therefore resembles an operation to lock slugs 64.

Finally, attaching flange 50 is installed on bearing bracket 14a, by bolting.

It is stipulated that the installation is accomplished such that each slug 64 is located, in the tangential/circumferential direction, between two spindles 52. This enables an improved inspection of the presence of these slugs to be carried out, for example using a spacer, which must be inserted axially between flange 50 and ring 46, from a tangential space delimited between two spindles 52, which is easily accessible for the operator.

Naturally, various modifications can be made by the skilled man in the art to the invention which has just been described, solely as non-restrictive examples.

The invention claimed is:

1. A structure for an aircraft turbojet comprising:
a rolling bearing including an outer ring;
a bearing bracket surrounding the outer ring;
a retaining ring interposed between the outer bearing ring and the bearing bracket;
means for connecting the outer ring to the bearing bracket, wherein the means for connecting includes:
an attaching flange installed on the bearing bracket; and
flexible means for connection attached to the outer bearing ring and to the attaching flange;
means for allowing axial retention of the outer bearing ring, if the flexible connection means fracture,
wherein the means enabling axial retention of the outer ring includes:
first stop means securely attached to the retaining ring, and capable of axially retaining the retaining ring relative to the bearing bracket in event that the flexible connection means fracture; and
second stop means securely attached to the retaining ring, and capable of axially retaining the outer ring relative to the retaining ring, in the event that the flexible connection means fracture,
wherein the second stop means includes multiple slugs spaced circumferentially relative to one another, wherein each slug is held in a slug insertion opening made in the retaining ring, wherein the slugs include a radially internal end which is located in a groove made on the outer bearing ring fitted with multiple radial clearance through-holes, emerging in a base of the groove, wherein each of the slugs is positioned radially opposite a full portion of the base of the groove.

2. A structure according to claim 1, wherein each of the slugs is located radially opposite the attaching flange.

3. A structure according to claim 1, wherein the flexible connection means includes multiple spindles spaced circumferentially relative to one another, wherein each one is U-shaped, and positioned in a radial plane.

4. A structure according to claim 1, wherein the first stop means includes a skirt positioned axially between the bearing bracket and the attaching flange.

5. A structure according to claim 4, wherein the skirt includes notches spaced circumferentially relative to one another, and cooperating with catches that are securely attached to the bearing bracket, to limit/prevent rotation of the retaining ring relative to the bearing bracket.

6. A method of installing a structure for an aircraft turbojet according to claim 1, comprising:
- inserting the outer bearing ring in the retaining ring, so as to align radially each of the clearance holes made in the outer ring with a slug insertion opening made in the retaining ring;
- inserting the slugs in the slug insertion openings, through the through-holes, so as to place the radially internal end of each slug in the groove of the outer ring;
- rotating the outer bearing ring such that each slug is located radially opposite the full portion of the base of the groove; and
- installing the attaching flange on the bearing bracket.

7. An aircraft turbojet comprising a structure according to claim 1.

* * * * *